United States Patent [19]

Nagano et al.

[11] 4,132,119
[45] Jan. 2, 1979

[54] DERAILLEUR FOR A BICYCLE

[75] Inventors: Masashi Nagano; Hideaki Fujimoto, both of Sakai, Japan

[73] Assignee: Shimano Industrial Company Limited, Osaka, Japan

[21] Appl. No.: 788,824

[22] Filed: Apr. 19, 1977

[30] Foreign Application Priority Data

Apr. 30, 1976 [JP] Japan .................................. 51-50682

[51] Int. Cl.$^2$ ........................... F16H 7/22; F16H 7/00
[52] U.S. Cl. ............................ 74/217 B; 74/242.11 B; 280/236
[58] Field of Search ............ 74/217 B, 242, 242.11 B; 280/236

[56] References Cited

U.S. PATENT DOCUMENTS

| 3,535,950 | 10/1970 | Shimano et al. | 74/423 R |
| 3,903,751 | 9/1975 | Dian | 74/217 B |
| 3,974,707 | 8/1976 | Nagano | 74/217 B |
| 4,030,374 | 6/1977 | Isobe | 74/242 |

FOREIGN PATENT DOCUMENTS

| 918313 | 9/1954 | Fed. Rep. of Germany | 74/217 B |
| 2521043 | 8/1977 | Fed. Rep. of Germany | 74/217 B |
| 530913 | 12/1940 | United Kingdom | 74/217 B |

Primary Examiner—Samuel Scott
Assistant Examiner—William R. Henderson
Attorney, Agent, or Firm—Stevens, Davis, Miller & Mosher

[57] ABSTRACT

A derailleur for a bicycle, which comprises a base member, a movable member and two linkage members carrying the movable member therewith in the relation of being swingingly movable with respect to the base member, a control member swinging independently from the movable member, a pair of plates for energy-storing, which sandwich therebetween one of the linkage members and cooperate with the control member through an engageable projection thereof and a positioning and maintaining member provided between the control member and one of the base member, movable member and two linkage members for positioning the driving chain guide cages with respect to any one of a plurality of sprockets whereby the speed change stage can preliminarily be selected when the bicycle is at a standstill or while running when not pedalling.

8 Claims, 12 Drawing Figures

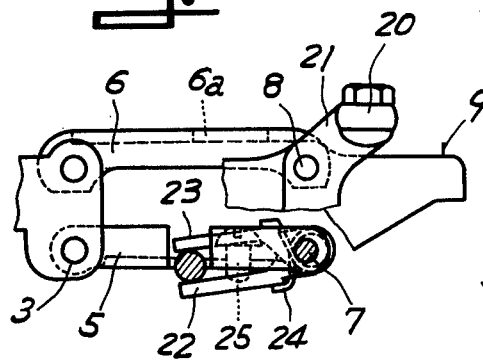
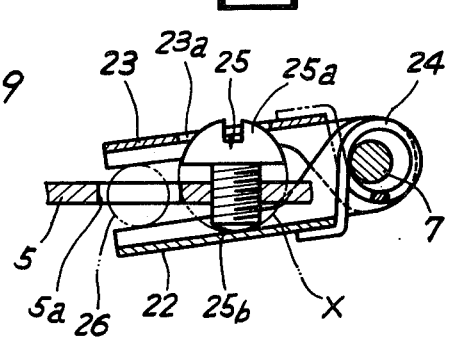
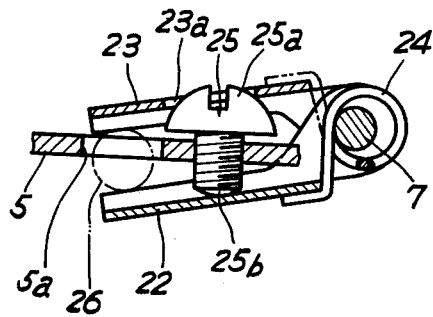
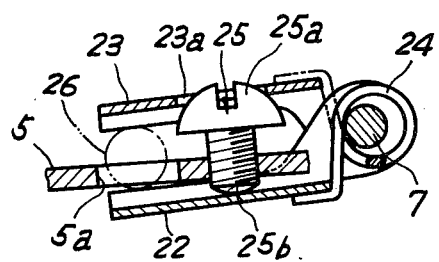
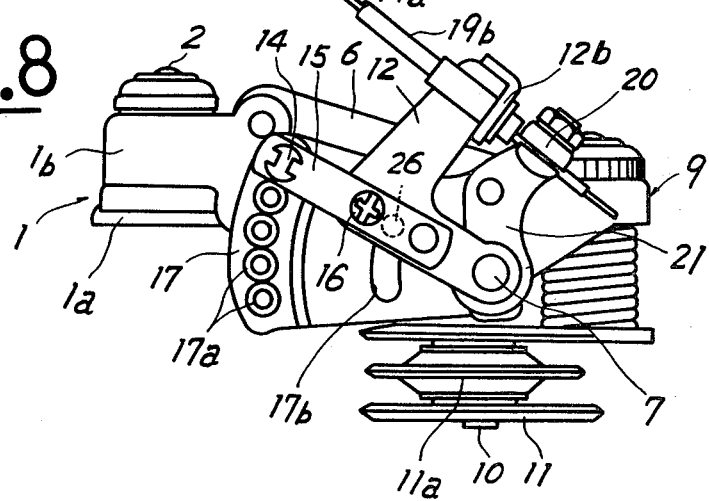

DERAILLEUR FOR A BICYCLE

This invention relates to a derailleur for a bicycle, and more particularly to a derailleur operable to selectively introduce a driving chain to one of three to five sprockets of a multi-speed transmitting freewheel which is mounted to a rear wheel hub of the bicycle.

Generally, this kind of derailleur, which is divided into the so-called linkage and rod types, is composed of a base member, a movable member having chain guide cages and linkage members through which the movable member is connected with respect to the base member. The derailleur as is well known, is operated by a control wire to introduce the driving chain to a selective one of the sprockets in such a manner that an operating lever pulls the control wire to allow the movable member to be swingingly movable against a spring force or restored by the spring force, which spring force comes from a return spring provided to urge the movable member unidirectionally. Alternatively, two control wires may be used, each of which is pulled to move either direction the movable member.

The conventional derailleur has no mechanism for positioning the chain guide pulleys carried on the movable member with respect to a selective one of the sprockets so that a cyclist is obliged to select the proper position of the pulleys only by his touch. Hence the conventional derailleur has the problem in that the driving chain is not exactly introduced for changing the bicycle speed and further it is impossible for it to be introduced unless the chain is travelling across a front gear and a rear wheel of the bicycle.

A derailleur is known in U.S. Pat. No. 3,974,707 with a means for properly positioning and maintaining the chain guide pulleys with respect to the sprocket, thereby always exactly introducing the driving chain to a selective one of the sprockets for changing the bicycle speed.

The invention of U.S. Pat. No. 3,974,707, however, has the problem not yet solved in that the speed change, even though exactly controllable, is unable to be performed when the bicycle is standing still or moving without pedalling.

To solve the abovementioned problem, a derailleur was designed to introduce the driving chain always exactly and preliminarily select the desired speed change stage for changing the speed regardless of being at a standstill or moving.

In other words, the derailleur of U.S. Pat. No. 3,974,707 has added to it one or more control members movable separately from other members. The control member is operated by either a control wire or its surrounding cable so as to move the movable member and is provided with a spring means urging the movable member in its moving direction. The aforesaid positioning and maintaining means is provided between the control member and one of the base member, movable member and linkage member, or between the control members so that when the movable member is subjected to a resistance against its movement in excess of the prescribed range, the control member only is moved against the spring force to energize the spring and then the movable member, when the resistance is released therefrom, is moved by restoration of the energized spring to be positioned at the preselected speed change stage. Thus, the bicycle speed is changeable when the bicycle is at a standstill or moving while not pedalling and the speed change is preselective. Such a derailleur, however, is complicated in construction and expensive to manufacture for the preselection from low speed to high speed and vice versa, and has a problem in that the positioning and maintaining means is not adjustable to properly position the movable member with respect to the base member.

The present invention has been designed to improve the derailleur of the abovementioned previous inventions in order to solve the problems thereof. A main object of the invention is to provide a derailleur of simple construction which is capable of changing the bicycle speed from low to high and vice versa while the bicycle is not moving or moving without pedalling and is capable of having the positioning and maintaining means adjusted to properly position the movable member with respect to the base member. Another object is to provide a derailleur capable of surely carrying out the preselection even with the foregoing adjustment.

The invention is characterized in that the control member is provided in addition to the base member, movable member and two linkage members with a pair of plates for energy-storing to sandwich therebetween one of the linkage members in the relation of being movable close to or apart therefrom; and an engageable projection formed at the control member to be engaged with between the plates; a spring provided between the plates to urge the plates toward the one linkage member; and a positioning and maintaining means provided between the control member and one of the derailleur components, such as the base member and movable member, so that one of the plates is shifted to deform the spring to be energized when the movable member is, against its movement, subjected to a resistance in excess of the prescribed range, and when the resistance is released, the energized spring force allows the movable member to shift to the desired speed-change stage.

Furthermore, the improvement of the invention is characterized in that the linkage member between the plates in the aforesaid construction is provided with an adjustable screw whose head and end abut against the plates respectively so that the adjustable screw may be adjusted to properly position the movable member with respect to the base member through the positioning and maintaining means. The head and the end faces of the screw are rounded to form a partial imaginary circle, whereby the extent of the spring deformation, i.e., the energized spring force, is made constant in the preselection by the plate displacement even after the screw is adjusted to properly position the movable member. This always ensures proper reselective control.

These and other objects and many of the attendant advantages of this invention will be readily appreciated as the same becomes better understood by reference to the following detailed description when considered in connection with the accompanying drawings, in which.

Figure 2:
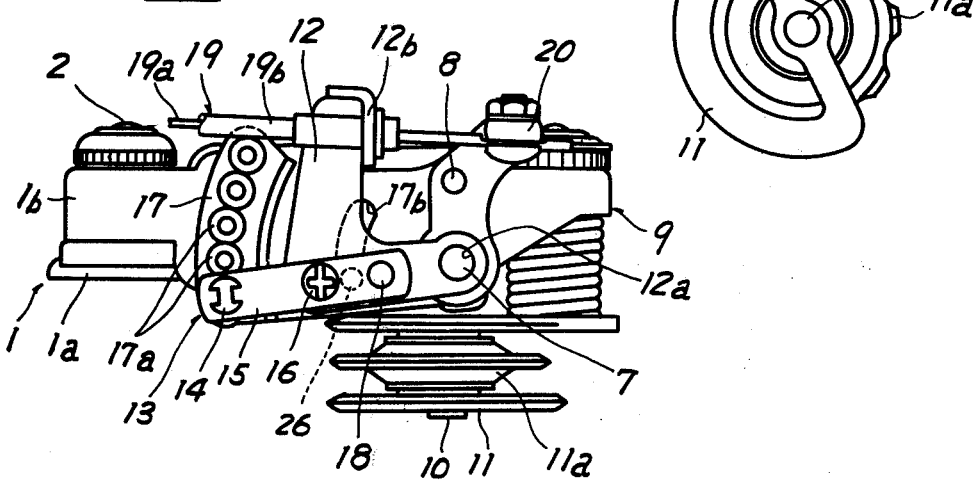
FIG. 2 is a bottom plan view thereof.
Figure 3:
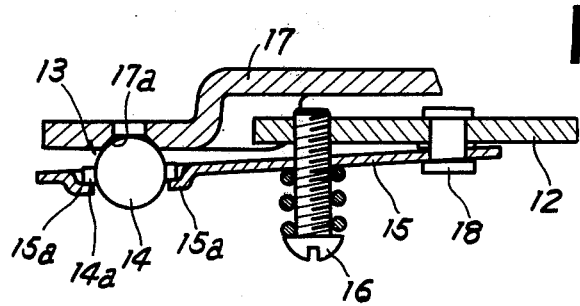
Figure 9:
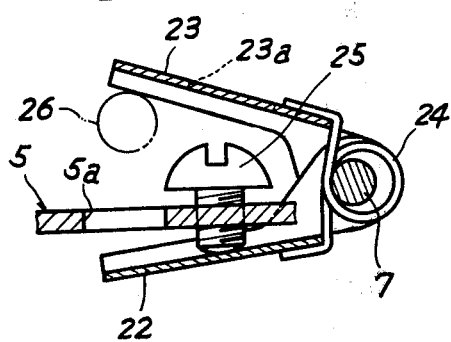
Figure 10:
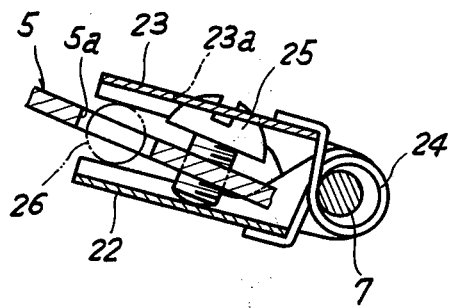
Figure 11:
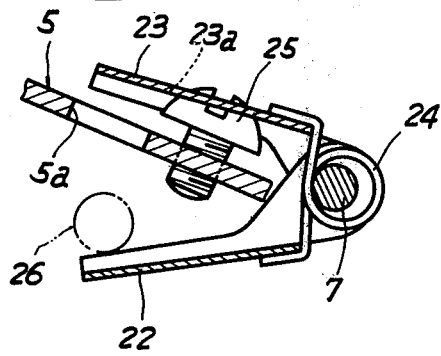
Figure 12:
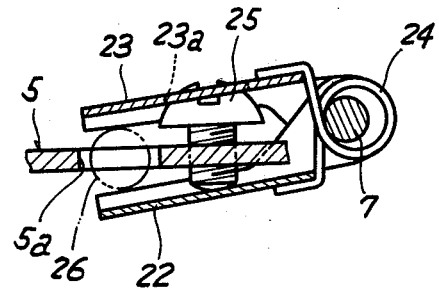

FIG. 3 is a longitudinal sectional view of the positioning and maintaining means, FIG. 4 is a partially cutaway sectional view of the derailleur in FIG. 2, FIG. 5 is an enlarged sectional view of the plates for energy-storing, FIGS. 6 to 7 are diagrammatic sectional views thereof showing the adjustment of the movable member position with respect to the base member, FIG. 8 is a bottom plan view of the derailleur in a different speed-changed condition from that in FIG. 2, FIGS. 9 and 11 are sectional views of the plates for energy-storing showing their displacements when the movable member is subjected to the resistance over the predetermined range against its movement, and FIGS. 10 and 12 are sectional views of the plates showing their conditions when the resistance is released from the movable member.

Figure 1:
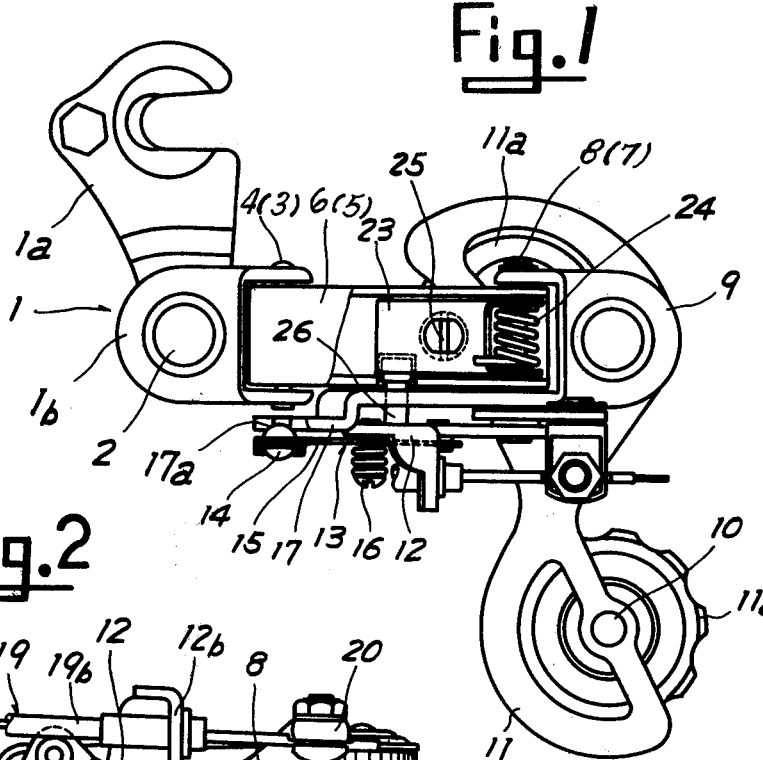
FIG. 1 is a front view of the derailleur of the invention.

The derailleur of a linkage type is shown in FIGS. 1 and 2, which basically comprises a base member 1, two parallel linkage members 5 and 6 and a movable member 9. The base member 1 comprises a bracket 1a fixed to the bicycle frame fork end (not shown) together with a hub shaft (not shown), a support 1b mounted to the bracket 1a through a pivot 2 in a rotatable relation within a given range only. The support 1b is swingable with respect to the bracket 1a through the pivot 2 but rigid in the moving direction of movable member 9, and has at one side two opposite tongues pivotally supporting the members 5 and 6 therewith through two pins 3 and 4.

The linkage members 5 and 6, equal in length and of a C-like section respectively, are mounted to the support 1b of the base member oppositely to each other at each open side of the same.

The movable member 9 is formed like the support 1b to have at its one side two opposite tongues and is pivotally supported on the two tongues to the free ends of linkage members 5 and 6 through pins 7 and 8. At the other side of the movable member 9 is mounted cages 11 carrying two chain-guide pulleys 11a through a pivot 10 turnable in a given range only.

The chain-guide pulleys 11a carry a driving chain (not shown) thereon and move in the axial direction of the multi-speed transmitting freewheel (not shown) so as to cause the driving chain to engage with a selected freewheel for changing the bicycle speed.

The basic construction of the derailleur as described is not different at all from well-known derailleurs.

The invention is directed to provide in the derailleur a control member 12 moving independently of the movable member 9; a pair of plates 22 and 23, serving as an energizer, sandwiching the linkage member 5 in the relation of being movable toward or away therefrom, which plates have engaged therebetween an engageable projection 26 formed at the control member 12 and are urged by a spring 24 toward the linkage member 5; and a positioning and maintaining means 13 provided between the control member 12 and one of the movable member 9 and the base member 1; so that the control member 12 may be moved against the spring 24 force when the resistance against the speed change caused by non-travelling of the drive chain is greater than the resistance against speed change when the chain is travelling. The restoration of the spring 24, when the resistance is released due to the drive chain starting to travel, may allow the movable member 9 to be moved to a desired speed change stage by means of the positioning and maintaining means 13.

In greater detail, the control member 12 is of a substantially L-like shape, has one arm bored at 12a and is mounted to the movable member 9 through the pin 7 inserted into the bore 12a in the relation of being swingable with respect to the movable member 9. The other arm of control member 12 bends at substantially the intermediate portion of the linkage member 5, projects outwardly of the linkage member 6, and has a fitting 12b for securing thereto one end of a sheath of a control wire to be hereinafter described.

The positioning and maintaining means 13 comprises a retainer 15 carrying a first cooperating means 14 of a rolling body, an adjuster 16 mounted to the retainer 15, and an extension 17 defining a plurality of engaging portions 17a.

The extension 17 is either of a plate incorporated with the movable member 9 or formed of a separate member fixed to movable member 7. The extension 17 extends at its rearmost end toward the base member 1 and terminates at substantially the base of the linkage members 5 and 6. At the rearmost end of the extension 17 are provided a plurality of engageable portions 17a which correspond in number to every speed-change stage along the path of the retainer 15 when changing the bicycle speed.

The second co-operating means 17a are composed mainly of through holes or recesses formed in the extension 17. The through holes, as shown in FIG. 3, are formed in a dish-like shape with one side open respectively so that each interval between two adjacent holes becomes a chevron shape. Hence, the first co-operating means 14 of the retainer 15, when located on the slope of the interval, may slip down into any one of the second co-operating means 17a to be engaged therewith.

The retainer 15 is formed of a strip, such as a leaf spring, having one end fixed to the control member 12 through a pin 18, and the other end extending to the rearmost end of the extension 17 and has a pair of tongues 15a, 15a formed by cutting from the same. The first co-operating means 14 is a ball with stems or a roller, supported on tongues 15a, 15a of the retainer 15 through the stems so as to be urged elastically toward each of the second co-operating means 17a. Also, at an intermediate portion of the retainer 15 there is mounted the adjuster 16 employing a screw-threaded member, such as a headed screw bolt, which adjuster passes through the retainer 15 at the intermediate portion thereof and is screwed at its end into the control member 12, so that the first co-operating means 14 may be adjustably urged toward the second co-operating means 17a.

Thus, the first co-operating means 14 engages with any one of the second co-operating means 17a so that the movable member 9, or the drive chain guide cages 11, are positioned with respect to the base member 1 and kept at the position corresponding to the desired speed change stage.

The movable member 9 is controlled by a control cable 19 comprising a wire 19a of relatively large diameter and little flexibility, the so-called push-pull type wire, and a sheath 19b for guiding the wire 19a, the wire 19a being supported at its one end to a fitting 20 of the movable member 9 and at the other end to an operating lever (not shown) fixed to the bicycle handle bar, the sheath 19b being fixed at its one end to a fitting 12b at the foremost end of the control member 12 and at the other end to a fixed plate of the operating lever.

Although the single push-pull type wire is preferred to be used as the control wire 19a for allowing the movable member to be moved for changing the speed, wires of other types may be used.

The pair of plates 22 and 23 sandwiching therebetween the linkage member 5 are pivotally supported at each one end thereof by the pin 7. The spring 24 is coiled at its intermediate portion so as to be supported by the pin 7 and seated at one end to the outer lateral surface of plate 22, and at the other end to plate 23 so that both the plates 22 and 23 are urged by the spring toward the linkage member 5.

Also, the linkage member 5 is provided with an adjustable screw 25 whose head 25a and end 25b forcibly abut against the plates 23 and 22 respectively, so that the adjustable screw 25 screwably controls the proper positioning of movable member 9 by the positioning and maintaining means 13 with respect to the base member 1.

In greater detail, when the driving chain carried on the chain-guide pulleys 11a of the cages 11 is out of position with respect to the sprockets of the multi-speed transmitting freewheel for changing the bicycle speed, the adjust-screw 25 is screwed toward the one plate 22 as shown in FIG. 6, whereby the plate 22 is pushed by the screw end to tighten the coils of the spring 24 of which one end is seated on the plate 22, while, the other plate 23 is pushed through the other end of the spring 24 by the force corresponding to the coil-tightening force. As a result, the linkage member 5 is pushed by the plate 23 downwardly around the pin 3 as shown in FIG. 4, to move the movable member 9 downwardly. To the contrary, when the adjustable screw 25 is unscrewed as shown in FIG. 7 from its conditions as shown in FIGS. 5 and 6, one end of the spring 24 seated on the plate 22 is subjected to the biasing force corresponding to that applied to the other plate 23 by the screw head being unscrewed to tighten the coils of the spring 24, whereby the link member 5 is turned upwardly around the pin 3 as shown in FIG. 4 through the biased plate 22 to result in moving upwardly the movable member 9.

The adjustable screw 25 is so formed that its head surface 25a and end face 25b are made round along an imaginary circle X as shown by the phantom line in FIG. 5, whereby the spaced interval between the plates 22, 23 swinging around the pin 7 and the distance between the tips of the head and end of the adjustable-screw 25 are kept constant when adjusting the movable member 9 to be properly positioned with respect to the base member 1. In addition, the head 25a of the screw 25 abuts the plate 23 through a slot 23a smaller in width than the diameter of the head so that the screw 25 is adjustable by use of a tool, such as a screwdriver, inserted through an eye-hole 6a formed in the linkage member 6 opposite to the plate 23 (FIG. 4).

The projection 26 engageable between both the plates 22 and 23 for energy-storing, serves to shift one plate with respect to the other. The projection 26 of a rod-like shape, fixed at its base to the control member 12, extends through the extension 17 to enter into a cutout 5a formed at the substantially intermediate lower portion of the linkage member 5, and abuts at its periphery against the inner surface of each end of the plates 22, 23. The extension 17 is provided with a slot 17b for receiving the projection 26 therein, which slot is formed arcuately around the pin 7, so that the projection 26 is movable along the arcuate slot 17b together with the control member 12 with respect to the extension 17.

In the abovementioned construction, when the driving chain carried on the chain-guide pulleys 11a of the cages 11 is in mesh with the high speed sprocket of the multi-speed free-wheel, the movable member 9 is positioned as shown in FIG. 2, and maintained at the position where the first co-operating means 14 of the positioning and maintaining means 13 is engaged with the outermost one of the engageable portions 17a at the linkage member 5 side.

In the instance, when the movable member 9 is subjected to the resistance within a predetermined range, the driving chain is introduced from the high speed sprocket to the low speed sprocket through the chain guide cages 11 in such a manner that the operating lever pulls the wire 19a to bring the fitting 20 thereof close to the fitting 12b of the sheath 19b so that the first co-operating means 14, as shown in FIG. 8, is engaged with the outermost second co-operating means 17a at the linkage member 6 side the movable member 9 is pushed fully to be displaced with respect to the base member 1, where the plates 22, 23 for energy-storing are in engagement with the engageable projection 26 through the spring 24 to be moved together with the linkage member 5 but not displaced thereagainst.

In changing from low speed to high speed, the wire 19a is pushed to bring the fitting 20 apart from the fitting 12b so that the first co-operating means 14 is engaged with the outermost second co-operating means 17a at the linkage member 5 side the movable member 9 is fully restored with respect to the base member 1.

The speed change when the movable member 9 is subjected to a resistance exceeding the predetermined range will be described hereinafter. First, the driving chain is changed from the high speed sprocket to the low speed sprocket through the driving chain guide cages 11 in such a manner that the operating lever pulls the wire 19a to swing the control member 12 around the pin 7 as shown in FIG. 8, but does not move the linkage member 5 because the movable member 9 and the linkage member 5 pivoted thereto are restricted from being moved by the resistance applied thereto. The engageable projection 26 moves along the arcuate slot 17b in the direction away from the linkage member 5. Hence, the moved projection 26 allows the plate 23 to be displaced with respect to the linkage member 5 as shown in FIG. 9 and the first co-operating means 14 of the positioning and maintaining means 13 is engaged with the outermost second co-operating means 17a at the linkage member 6 side and also the displaced plate 23 compresses the spring 24 to store the spring reactive force in both the plates 22, 23. Under this condition, when the resistance is released from the movable member 9, the stored energy at the plates 22, 23 is released.

When the driving chain is changed from the low speed sprocket to the high speed sprocket through the drive-chain guide cages 11, controlled by the wire 19a pushed by the operating lever, the resistance similarly restricts the movable member 9 and the linkage member 5 from movement around the pin 7 to the position as shown in FIG. 2. The linkage member 5 is at rest, whereby the projection 26 is moved along the slot 17a from the position shown in FIG. 8 in the direction away from the linkage member 6.

Hence, the moved projection 26 allows the plate 22 to be displaced with respect to the plate 23 as shown in FIG. 11, and the first co-operating means 14 is engaged with the outermost second co-operating means 17a at the linkage member 5 side. The displaced plate 22 compresses the spring 24 to store its spring reactive force at the plates 22, 23. Under this condition, the stored energy of both the plates 22, 23, when the resistance is released from the movable member 9, allows the linkage member 5 to move toward the displaced plate 22 as shown in FIG. 12, to move the movable member 9, thus changing the driving chain from the low speed sprocket to the high speed sprocket.

Further, when the driving chain is changed to one of the middle speed sprockets of the multi-speed transmitting freewheel, the wire 19a may be pulled or pushed to allow the first co-operating means 14 to be engaged with one of the intermediate second co-operating means 17a.

In the aforesaid embodiment, the plates for energy-storing are mounted to the linkage member 5 in the relation of being swingable thereto, but they may be made perpendicularly movable with respect to the lengthwise direction of the linkage member. In brief, it is enough for the plates to be made movable toward or away from the linkage member 5.

Alternatively, the control member 12, which is pivoted to the movable member 9 in the aforesaid embodiment, may be pivoted to the support 1b of the base member 1 through the pin 3 or 4.

Furthermore, the positioning and maintaining means 13 may be provided between the control member 12 and the support 1b of the base member 1 instead of between the former and the movable member 9. The control member 12 if so pivoted to the support 1b and extension 17 extends from the support 1b toward the movable member 9 then the positioning and maintaining means 13 may be mounted between the control member 12 and the extension 17.

In summary, the derailleur of the invention is provided with four members i.e., a base member, two linkage members and a movable member having the driving chain guide cages; a control member carrying therewith either wire or a sheath of the control cable and movable independently from the four members; a pair of plates for energy-storing, which are provided to sandwich one of the linkage members therebetween in a relation of being movable toward or away from the one linkage member and are urged toward the one linkage member by means of a spring. A projection formed at the control member engages between the plates; and the positioning and maintaining means is provided between the control member and one of the four members. Hence, the derailleur, simple in construction, is advantageous in that the speed change from low to high and vice versa by use of the control cable is made certain even when the movable member is subjected to a resistance over the prescribed range against its movement. The driving chain, when the resistance is released from the movable member, can be introduced automatically to a selected sprocket by means of the energy stored in the plates and also exactly and properly done by the positioning and maintaining means.

Also, the derailleur is advantageous in that an adjustable screw, which is attached to the linkage member abuts at its head and end against both the plates respectively and is adapted to adjust the linkage member or the movable member by the positioning and maintaining means so that the driving chain guide cages carried by the movable member may be exactly adjusted in position with respect to the multi-speed transmitting freewheel simply by screwing the adjustable screw.

Furthermore, the adjustable screw, whose head surface and end face are made round along an imaginary circular line, makes it possible to approximately equalize the urging forces applied to the head and end through both the plates for energy-storing when adjusted to properly position the movable member with respect to the base member.

While an embodiment of the invention has been shown and described, the invention is not limited to the specific construction thereof, which is merely exemplified in the specification rather than defined.

What is claimed is:

1. A bicycle derailleur operated by a control cable having a wire and a sheath for changing the bicycle speed by positioning a chain on a selected one of a plurality of sprockets, comprising:
   (a) four members, which include a base member, two linkage members pivoted to said base member, and a movable member pivoted to said linkage members and having cages carrying driving chain guide pulleys, said movable member being movable in reciprocation axially of the sprockets and with respect to said base member, one of said linkage members having an access hole therein,
   (b) an L-shaped control member swingable independently from said four members having an arm onto which is mounted means for attaching thereto one of said wire and sheath of the control cable, an arm pivotally mounted to one of said movable member and base member, and an engageable projection extending toward one of said two linkage members,
   (c) a pair of plates for storing energy, said plates being mounted to one of said linkage members to sandwich said linkage member in the relation of moving toward or away from said one linkage member, said plates being engaged therebetween with said engageable projection,
   (d) a spring urging said pair of plates toward said one linkage member for storing energy, and
   (e) a positioning and maintaining means provided between said control member and one of said four members to position and maintain the movable member with respect to the base member, said positioning and maintaining means comprising a retainer carrying a rolling body attached to said control member as a first cooperating means and an extension movable with one of said movable member and base member having a series of recesses therein as a second cooperating means which position said driving chain guide cages carried by said movable member.

2. The derailleur according to claim 1, wherein said control member is swingably mounted to said movable member.

3. The derailleur according to claim 2, wherein said extension extends toward said base member.

4. The derailleur according to claim 1, wherein said control member is swingably mounted to said base member.

5. The derailleur according to claim 4, wherein said extension extends toward said movable member.

6. The derailleur according to claim 1, wherein said control cable is of a push-pull type.

7. The derailleur according to claim 1, including an adjustable screw mounted to the linkage member sandwiched between said plates and said head and end of the adjustable screw abut against said resilient plates so that said movable member may be adjusted in position with respect to said positioning and maintaining means.

8. The derailleur according to claim 7, wherein said head and end of the adjust-screw are made round in conformance with the circumference of an imaginary circle.

* * * * *